Figures 1, 2, 3:
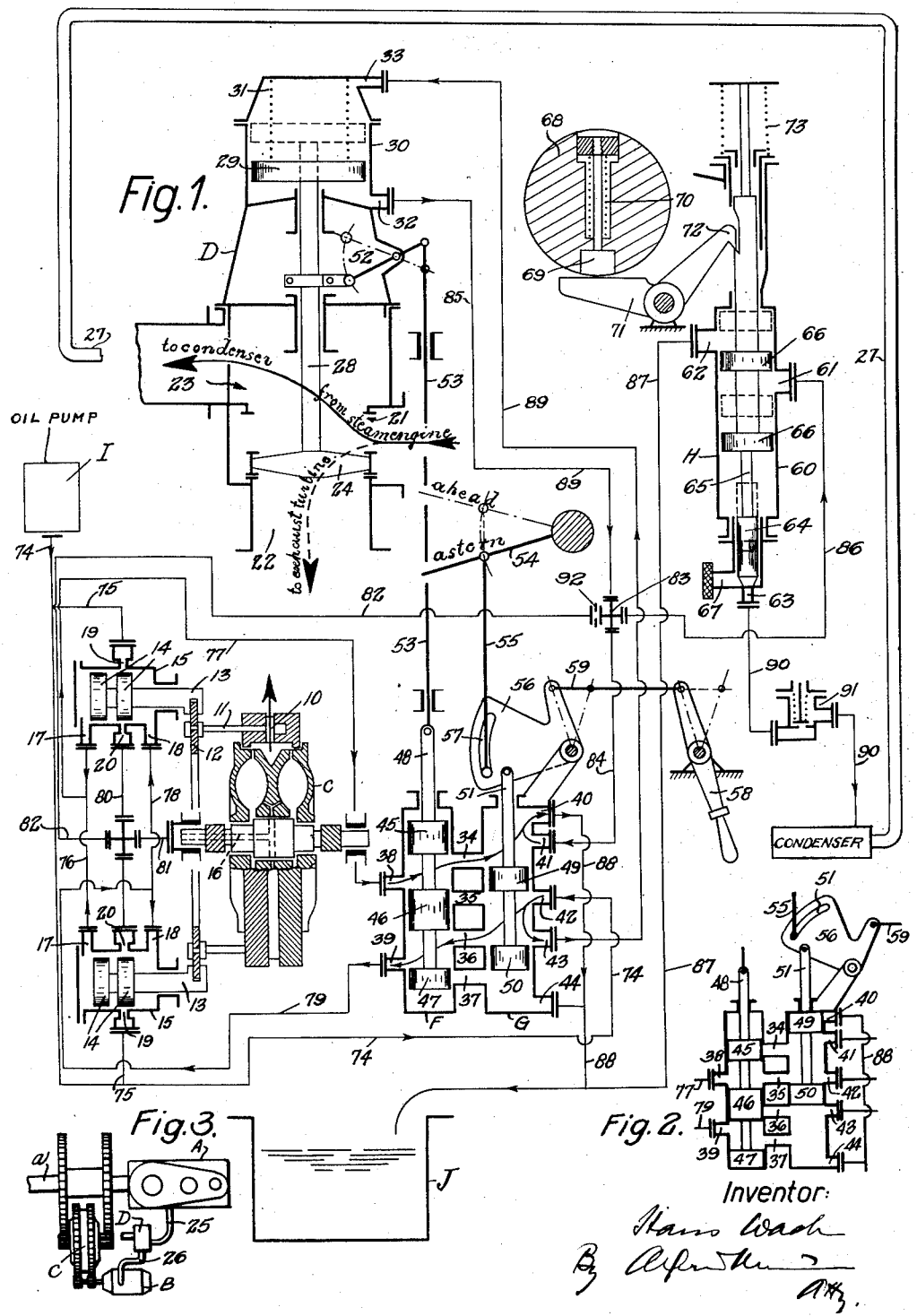

April 19, 1932. H. WACH 1,854,818
STEAM ENGINE TURBO COMBINATION
Filed Oct. 12, 1928 2 Sheets-Sheet 1

Inventor:
Hans Wach

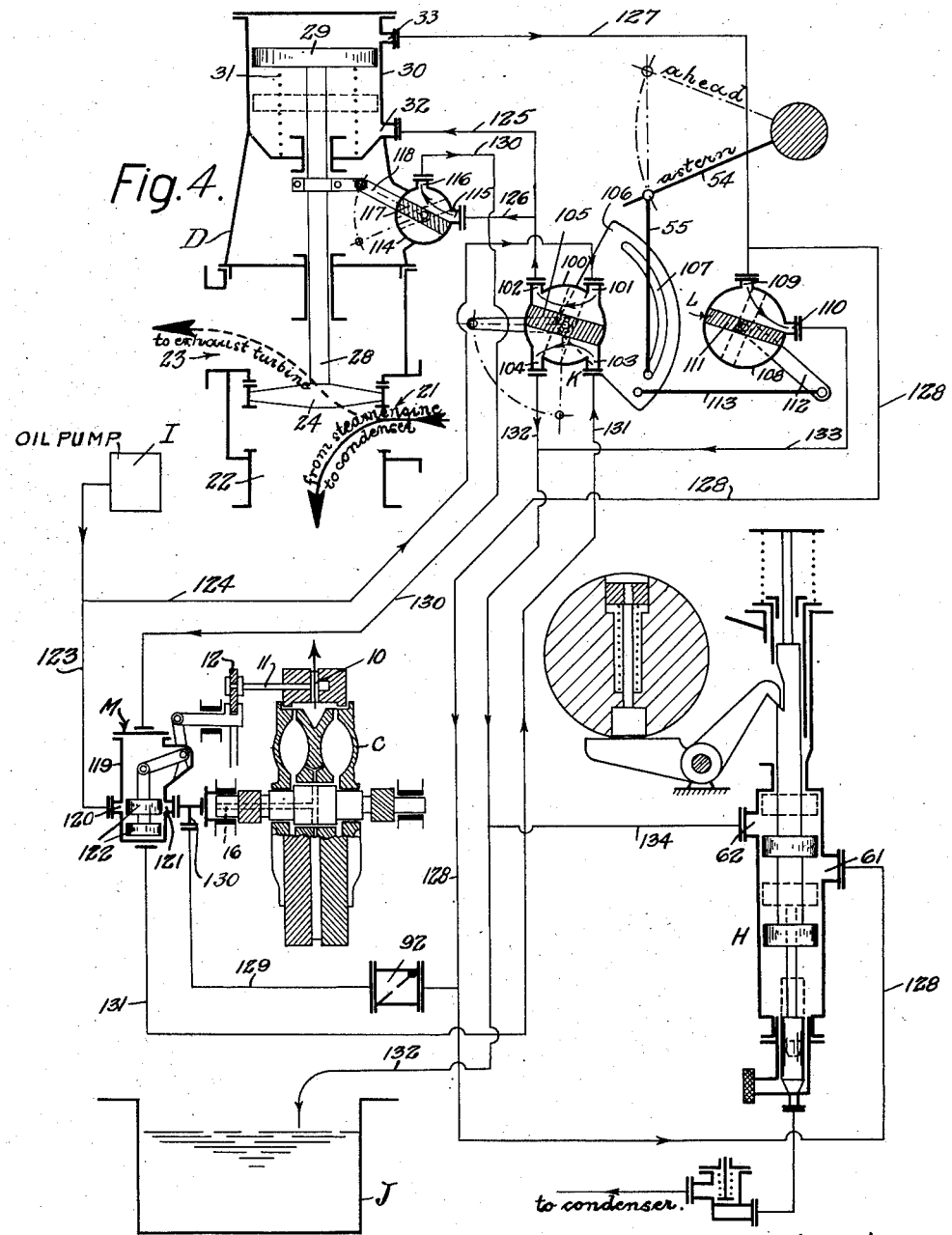

Patented Apr. 19, 1932

1,854,818

UNITED STATES PATENT OFFICE

HANS WACH, OF BREMEN, GERMANY

STEAM ENGINE TURBO-COMBINATION

Application filed October 12, 1928, Serial No. 312,021, and in Germany September 12, 1927.

This invention relates to power plants especially adapted for the propulsion of ships, and has particular reference to a power plant embodying a reciprocating steam engine and a steam turbine utilizing the exhaust steam from the reciprocating engine, the latter engine being coupled directly with a shaft to be driven and the turbine being connected with the same shaft through a fluid coupling, whereby both engines may be employed to drive the shaft thus to secure maximum efficiency from the steam consumed.

The general object of the invention is to provide a novel means automatically operable to cut off the supply of steam to the turbine and to vent the fluid coupling when the reciprocating engine is reversed, and in this connection a special object of the invention is to provide for the venting of the fluid coupling only after the supply of steam to the turbine has been cut off whereby racing of the turbine is avoided.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings:

Figure 1 is a diagrammatic view of a power plant embodying parts constructed and arranged to operate in accordance with the invention and showing the parts in the position to which they are moved upon reversing of the reciprocating engine.

Figure 2 is a diagrammatic view of the pressure oil control valves illustrating the position of the same during normal operation of the power plant with the turbine coupled to the drive shaft; and Figure 3 is a detail diagrammatic view illustrating the relative arrangement of the reciprocating engine, the turbine and the fluid couplings; and Figure 4 is a view similar to Figure 1 illustrating an alternative embodiment of the invention.

Referring first to Figure 3 of the drawings, A designates generally a reciprocating steam engine connected directly with a shaft $a$ to be driven, and B designates generally a steam turbine connected with said shaft $a$ through a fluid coupling designated generally as C.

The fluid coupling C may be of any preferred or well known type such that a supply of fluid thereto effects an operative connection between the turbine B and the shaft $a$, and the venting of fluid therefrom effects disconnection of the turbine from said shaft. To this end, said coupling is conventionally illustrated as having a vent port 10 controlled by a reciprocal valve 11 carried by a ring 12, the said ring having connected therewith a pair of piston rods 13 each carrying a pair of spaced pistons 14 operating in cylinders 15, 15, respectively, whereby admission of fluid under pressure to the outer ends of said cylinders effects movement of the ring and the valve 11 to close the port 10, and whereby admission of fluid to the inner ends of said cylinders effects movement of said ring and said valve to open the port 10 thus to permit escape of fluid from the coupling. The shaft of the coupling is provided with a bore 16 through which fluid is adapted to be supplied to the coupling.

Each cylinder 15 is provided at its outer end with a port 17, at its inner end with a port 18, and intermediate said ports 17 and 18 with a pair of ports 19 and 20, and when the valve 11 is closed the respective pairs of pistons 14, 14 are disposed at opposite sides of the ports 19—20.

At D is designated generally a steam valve having three ports designated as 21, 22 and 23, and provided with a reciprocal valve 24 for controlling the passage of steam through said ports. The port 21 is connected with the exhaust steam outlet of the reciprocating engine A by a pipe 25, the port 22 is connected with the turbine B by a pipe 26, and the port 23 is adapted for connection by a pipe 27 with a condenser illustrated diagrammatically at the lower right hand corner of Figure 1 and designated as E. As shown, the arrangement of the valve 24 is such that when the same is moved to one of its two operative positions it blanks the port 22 and thus cuts off the supply of steam to the turbine and at the same time establishes communication between the ports 21 and 23, whereby exhaust steam from the turbine is directed to the condenser. On the other hand, the arrangement is such that when said valve is moved to its other operative position, the port 23 is blanked and the ports 21 and 22 are placed in communication with each other, whereby exhaust steam from the reciprocating engine is directed to the turbine B for operating the latter.

The valve 24 is inclusive of a stem 28 which carries a piston 29 and, as shown, this piston 29 is disposed within a cylinder 30 formed preferably as part of the steam valve designated generally as D, there being a coil spring 31 interposed between said piston 29 and one end of the cylinder 30 tending constantly to urge the valve 24 to its first mentioned position aforesaid in which the supply of steam to the turbine is cut off. At the ends of the cylinder 30 are ports 32 and 33, respectively.

At F and G are designated, respectively, an oil regulating valve and an oil distributing valve, these two valves being connected with one another and preferably being embodied in a unitary structure, although this is not essential.

The casings of the valves F and G are connected with each other by four ports designated as 34, 35, 36 and 37 spaced longitudinally of said cylinders. In addition, the casing of the valve F is provided with two other ports designated as 38 and 39 which likewise are spaced longitudinally of said casing. On the other hand, the casing of the valve G is provided with five additional longitudinally spaced ports designated as 40, 41, 42, 43 and 44, respectively.

Within the valve casing F are three reciprocal pistons 45, 46 and 47 carried in spaced relation upon a rod 48 which extends through one end of the casing, while within the other valve casing G is a pair of reciprocal pistons 49 and 50 carried in spaced relation upon a rod 51 which projects through one end of said casing G.

Each set of pistons has two operative positions and the spacing of the ports in the respective valve casings F and G and the spacing of the pistons on the rods 48 and 51 is such that when the pistons 45—46—47 are in one of their operative positions, the port 34 is blanked by the piston 45, the port 36 is blanked by the piston 46 and communication is established between the ports 35—38 and between the ports 37—39, respectively, as shown in Figure 3. On the other hand, as shown in Figure 1 of the drawings, when said pistons 45—46—47 are in their other operative position, the port 35 is blanked by the piston 46, the port 37 is blanked by the piston 47, and communication is established between the ports 34—38 and between the ports 36—39, respectively.

In one of the operative positions of the pistons 49—50, as shown in Figure 3, the port 40 is blanked by the piston 49, communication is established between the port 42 and the ports 35 and 41, the piston 50 is disposed between the ports 42—43 and 35—36, and communication is established between the ports 37, 43 and 44. In the other operative position of said pistons 49—50, as shown in Figure 1, the piston 49 is disposed between the ports 34 and 35, and the piston 50 is disposed between the ports 36 and 37, communication thus being established between the port 42 and the ports 36 and 43, and between the ports 40, 41 and 34.

A lever 52 is intermediately pivoted to the steam valve D and is connected at one end with the valve stem 28 and at its other end with the piston rod 48 of the valve F by a link or rod 53 so that when the steam valve 24 is moved to a position to admit steam to the turbine the pistons 45—46—47 are moved to the position shown in Figure 2, and when the steam valve is moved to a position to cut off steam from the turbine the said pistons are moved to the position shown in Figure 1.

At 54 is designated a reversing lever which is movable between two positions, in one of which it is effective in a well known manner to cause the reciprocating engine to operate in an "ahead" direction, and in the other of which it is effective to cause said engine to operate in a "reverse" direction.

A link 55 is connected at one end with the lever 54 and at its other end has a lost motion connection with a pivoted segment 56 by means of a slot 57 formed in said segment, whereby the reversing lever 54 is movable from its "reverse" position, shown by full lines in Figure 1, to its "ahead" position shown by dotted lines in said figure, without effecting movement of the segment 56.

The piston rod 51 is connected with the segment 56 for actuation by the latter, and, as shown, the length of the slot 57 is such that when the reversing lever 54 is in "reverse" position the pistons 49-50 are disposed in the position shown in Figure 1. Consequently, it follows, due to the slot 57, that if the reversing lever 54 is moved from its "reverse" to its "ahead" position, no movement of the pistons 49—50 takes place, and it is necessary therefore that the segment 56 be manually rotated to effect movement of the pistons 49—50 to their position shown in Figure 2.

Thus, to the end of providing a convenient means of manually operating the pistons 49—50 from their position shown in Figure 1 to their position shown in Figure 3, a hand lever 58 is provided which is operatively connected with the segment 56 by a link 59.

At H is designated generally a valve device which is automatically operable to place the condenser E in communication with the atmosphere, whereby the vacuum therein is broken, upon the speed of the turbine exceeding a predetermined rate. This valve device comprises a valve casing 60 having a pair of longitudinally spaced ports 61 and 62 in the side thereof, and a port 63 in the end thereof which is normally closed by a valve 64 carried by a piston rod 65 on which is a pair of spaced pistons 66, 66, the arrangement being such that when the valve 64 is moved to uncover the port 63 the latter is placed in communication with the atmosphere through a port 67 in the casing 60.

A rotatable element of the turbine is designated as 68 and carried by this element is a member 69 which normally is held in a retracted position relative to said element by a spring 70 and which is adapted to be projected from said element by centrifugal force when the rotative speed of said element exceeds a predetermined rate.

At 71 is designated an intermediately pivoted lever one end of which is disposed to be engaged by the member 69 when the latter is projected, and the other end of which is provided with a hook-like formation 72 for engagement in a notch in the piston rod 65 to hold the latter normally in a position in which the valve 64 is in closing relation to the port 63.

A spring 73 is suitably arranged for cooperation with the piston rod 65 to urge the same constantly in a direction to unseat the valve 64, and the pistons 66, 66 and the ports 61, 62 are so spaced and arranged that said pistons deny communication between said ports when the valve 64 is closed, and establish communication between said ports when the valve is opened.

At I is designated conventionally an oil pressure pump from which an oil delivery pipe 74 leads to and is connected with the port 42 of the valve G, there being branches 75, 75 from this pipe leading to and connected with the ports 19, 19 of the cylinders 15, 15, respectively.

The ports 17, 17 of the cylinders 15, 15 are connected together by a pipe 76, and with this latter pipe is connected a pipe 77 which leads to and is connected with the port 38 of the valve F. Likewise, the ports 18, 18 of the cylinders 15, 15 are connected together by a pipe 78 with which is connected a pipe 79 leading to and connected with the port 39 of the valve F. Also, the ports 20, 20 of the cylinders 15, 15 are connected together by a pipe 80 from which a branch pipe 81 leads to and is connected with the bore or duct 16 in the turbine shaft, and from which also leads a pipe 82 which is connected through a four-way fitting 83 and a pipe 84 with the port 41 of the valve G. By way of the fitting 83 the pipe 84 also is connected by a pipe 85 with the port 32 of the steam valve cylinder 30, and by a pipe 86 with the port 61 in the cylinder 60 of the vacuum breaker valve H.

At J is designated a sump or tank into which oil used in the system is adapted to be discharged, and leading to this sump or tank from the port 62 in the cylinder 60 of the valve H is a pipe 87, a branch 88 of this pipe 87 being connected with the ports 40 and 44 of the valve G.

Connecting the port 43 of the valve G with the port 33 of the steam valve cylinder 30 is a pipe 89. Finally, the port 63 of the valve H is connected with the condenser E by a pipe 90 in which is interposed a spring closed valve 91 which opens in the direction of the condenser.

Assuming that the pistons of the valves F and G are disposed in the positions shown in Figure 2, that the pistons of the valve H are disposed as shown in Figure 1, and that the reversing lever is the "ahead" position, it is apparent that oil under pressure from the pump I will flow by way of the pipe 74 through the ports 42, 35 and 38 of the valves F and G and through the pipe 77 and pipe 76 to the outer ends of the cylinders 15, 15, thereby moving the pistons 14, 14 inward with consequent inward movement of the ring 12 and closing of the port 10 of the fluid coupling by the valve 11. The ports 19 and 20 now being in communication with one another through the space between the pistons 14, 14, oil from the pump will be delivered by way of the pipe 74 and branch pipes 75 and pipes 80, 81 to the fluid coupling through the duct 16 in the shaft thereof and thus effect an operative connection of the turbine B with the shaft a. The fitting 83 is inclusive of a throttling valve 92 which serves to retard the flow of oil from the pipe 80 through the pipe 82, thus to assure filling of the fluid coupling C in advance of operation of the steam valve to admit steam to the turbine. In other words, immediately the valve 11 is closed, oil flows to and fills the fluid coupling. At the same time, oil flows by way of the pipe 74, through the ports 42 and 41 of the valve G, pipe 84, fitting 83 and pipe 89 to the inner end of the steam valve cylinder 30, thereby acting on the piston 29 to move the steam valve 24 to its position aforesaid against the force of the spring 31 in which the port 23 leading to the condenser is closed and the ports 21 and 22 are placed in communication with each other. Thus, exhaust steam from the reciprocating engine is supplied to the turbine which is now in driving relation to the shaft *a*. At the same time, oil is prevented from escaping by way of the pipe 86 through the valve H because of the pistons 66, 66 in said valve denying communication between the ports 61 and 62.

If now the reversing lever is moved to the "reverse" position shown in Figure 1, with consequent movement of the pistons of the valve G to the position shown in said figure, it is apparent that the ports 40, 41 will be placed in communication with one another whereby the inner end of the cylinder 30 will be placed in oil discharging relation to the sump or tank J through the pipes 89, 84 and 88 whereby the spring 31 will be permitted to act to move the valve 24 to quickly close the port 22 and thus cut off the supply of steam to the turbine, the ports 42 and 43 being placed in communication with each other at the same time whereby oil is directed from the pipe 74 to the pipe 85 and thus to the outer end of the cylinder 30 to insure positive closing of the valve 24.

Simultaneously with movement of the steam valve 24 to the position mentioned, the pistons of the valve F are moved to the position shown in Figure 1, with the result that the ports 38, 34 and 40 are placed in communication with one another to permit drainage of oil from the outer ends of the cylinders 15 thus to permit the pistons 14, 14 to be moved outwardly. Also, the ports 36 and 39 are placed in communication with each other whereby oil from the pipe 74 is permitted to flow through the pipe 79 and pipe 78 to the inner ends of the cylinders 15, 15 thus to move the pistons 14, 14 outward to actuate the valve 11 to open the port 10, thus to permit emptying of the fluid coupling, and at the same time to blank the ports 19 and 20 against the further supply of oil to said coupling. In this way the turbine obviously is disconnected from the shaft *a* only after the valve 24 has been operated to cut off the supply of steam to the turbine, whereby racing of the latter is prevented.

If for any reason the engine A should tend to exceed a predetermined rate of speed with a consequent abundance of steam supply to the turbine and an excess rate of the latter, centrifugal force will cause the member 69 to be projected with the result of tripping the latch constituted by the lever 71, thereby releasing the piston rod 65 and permitting the spring 73 to open the valve 64. The condenser thus will be placed in communication with the atmosphere through the pipe 90 and the ports 63—67 and breaking of the vacuum in the condenser will take place in accordance with the regulation of the spring pressure tending to hold valve 91 normally closed, whereby the speed of the engines will proportionately be reduced. At the same time a venting of the system will be effected through the now communicating ports 61 and 62 with the result that the system will require manual attention to again restore the same to a desired operative condition.

Obviously, after the reciprocating engine has been reversed and if the lever 54 then is moved to the "ahead" position, as illustrated by dotted lines in Figure 1 of the drawings, it is necessary because of the lost motion connection between the lever 54 and the segment 56 afforded by the slot 57 in the segment 56 to manipulate the lever 58 to manually reset the pistons of the valve G as shown in Figure 2 to provide for normal or "ahead" combined operation of the reciprocating engine and the turbine, whereby an additional factor of safety is embodied in the system, necessitating connection of the turbine through the fluid coupling with the reciprocating engine and the driven shaft before steam is admitted to the turbine.

Referring now to Figure 4 of the drawings, it will be observed that the general arrangement is substantially the same as shown in Figures 1 to 3 with the exception that a pair of rotary valves designated generally as K and L are employed in lieu of the valves F and G.

The main elements of the mechanism shown in Figure 4, such, for example, as the valve D, the fluid coupling C and the valve H remain the same, or substantially the same, as the corresponding parts illustrated in Figures 1 to 3. Therefore, the same reference characters as have been employed in Figures 1 to 3 are for convenience used to designate the same parts in Figure 4.

The valve K is inclusive of a casing 100 having four ports 101, 102, 103 and 104, and within said casing is a rotatable valve 105 which is movable between the full and dotted line positions shown, in the former of which communication is established between the ports 101—102 and 103—104 and communication of either port 101 or 102 with either port 103 or 104 is denied, and in the latter position of which comunication between the ports 101—103 and 102—104 is established and communication of either port 101 or 103 with either port 102 or 104 is denied.

A segment 106 is carried by the valve 105 and said segment is slotted as indicated at 107, the link 55 of the reversing lever 54 operating in said slot in the same general manner as heretofore described in connection with the embodiment of the invention illustrated in Figure 1.

The valve L is inclusive of a casing 108 having two ports 109—110, and within said casing is a rotatable valve 111 which is movable between a position to place said ports 109, 110 in communication with one another, as shown by full lines, and a position to deny communication between said ports as shown by dotted lines. Connected with said valve 111 is a lever arm 112 which is connected by a link 113 with the segment 106, the arrangement being such that the valves 105, 111 are movable in unison to their full and dotted line positions.

Carried by the casing of the valve D is a valve casing 114 having two ports 115 and 116, and within said casing is a rotatable valve 117 which is equipped with a lever arm 118 that is connected with the stem 28 of the valve 24. According to Figure 4 of the drawings the port 23 of the valve D is connected with the turbine (not shown) and the port 22 is connected with the condenser (not shown), the spring 31 therefore being arranged to constantly urge the valve 24 to a position to close the port 23. When the valve 24 is moved to a position to cut off the supply of steam to the turbine the valve 117 is moved to a position to place the ports 115, 116 in communication with each other as shown by full lines, and when the valve 24 is moved to a position to close the port 22 and open the port 23 the valve 117 is moved to a position to deny communication between the ports 115, 116 as shown by dotted lines.

For actuating the valve 11 of the fluid coupling C a cylinder and piston device designated generally as M is provided. This device consists of a cylinder 119 provided with a pair of ports 120, 121 and having a pair of pistons 122, 122 on a common piston rod reciprocal therein, the piston rod being operatively connected with the ring 12 for moving the same to open and close the valve 11. When the valve 11 is open one of the pistons blank the ports 120, 121 and when the valve 11 is closed the pistons establish communication between said ports.

From the oil pressure pump I an oil delivery pipe 123 leads to and is connected with the port 120, and from said pipe 123 a branch pipe 124 leads to and is connected with the port 101 of the valve K. From the port 102 of the valve K a pipe 125 leads to the port 32 of the cylinder 30, and a branch 126 of said pipe 125 leads to the port 115 of the valve 114. The port 33 of the valve casing 30 is connected by a pipe 127 with the port 109 of the valve L, and from said pipe 127 a pipe 128 is extended to the port 61 of the valve H, this pipe 128 in turn having a branch 129 which is connected through a three way fitting 130 with the port 121 in the casing of the device M and with the duct 16 in the turbine shaft, said branch pipe 129 having the regulating valve 92 interposed therein to retard flow of oil from the pipe 129 to the pipe 128, thus to assure filling of the fluid coupling C in advance of the operation of the steam valve D to admit steam to the turbine.

Connecting the port 116 of the valve 114 with the upper end of the cylinder 119 is a pipe 130, while connecting the lower end of said cylinder 119 with the port 103 of the valve K is a pipe 131. Leading from the port 104 of the valve K to the sump J is a pipe 132 from which branch pipes 133, 134 lead to the port 110 of the valve L and the port 62 of the valve H, respectively.

From the foregoing considered in connection with the description of the operation of the system illustrated in Figures 1 to 3, it is manifest that when the reversing lever 54 is in its "ahead" position the valve 24 is disposed in a position to admit steam to the turbine and that the valve 11 is maintained closed and oil is supplied to the fluid coupling to connect the turbine with the power shaft. On the other hand, when the reversing lever is moved to the "reverse" position with consequent actuation of the valves K and L to the full line positions shown, the upper end of the cylinder 30 obviously is vented through the pipe 127, valve L and pipes 133, 132, with the result that the spring 31 is permitted to act to quickly move the valve 24 to close the port 23 and thus cut off the supply of steam to the turbine, whereupon the valve 117 is moved to its full line position. Thus, oil from the lower end of the cylinder 119 is vented by way of the pipe 131, ports 103, 104 of the valve K and pipe 132, and at the same time oil under pressure is supplied to the upper end of the cylinder 119 by way of pipe 124, ports 101, 102 of the valve K, pipes 125, 126, ports 115, 116 of valve 114 and pipe 130. Thus, the pistons 122 are moved to the position shown to cut off the supply of oil to the fluid coupling and to effect opening of the port 10, all of which manifestly must necessarily occur following actuation of the valve 24 to cut off the supply of steam to the turbine so that racing of the latter is prevented.

Since in other respects the operation of the system shown in Figure 4 is generally the same as described in connection with the system shown in Figures 1 to 3, further description is deemed to be unnecessary.

I claim:

1. In combination with the steam exhaust conduit of a reciprocating steam engine, the steam inlet conduit of a turbine engine, the reversing lever of the reciprocating engine, and a fluid coupling device for connecting the two engines; a valve movable to two positions in one of which it directs steam from the exhaust conduit of the reciprocating engine into the inlet conduit of the turbine and in the other of which it diverts steam from the inlet conduit of the turbine, a source of fluid under pressure, and a pair of valve devices operable by said reversing lever and by said steam control valve, respectively, to control the supply and exhaust of fluid to and from said fluid coupling.

2. In combination with the steam exhaust conduit of a reciprocating steam engine, the steam inlet conduit of a turbine engine, the reversing lever of the reciprocating engine, and a fluid coupling device for connecting the two engines; a valve movable to two positions in one of which it directs steam from the exhaust conduit of the reciprocating engine into the inlet conduit of the turbine and in the other of which it diverts steam from the inlet conduit of the turbine, a source of fluid under pressure, a device operable by movement of said reversing lever to direct a flow of fluid to reverse the status of said steam control valve, and a device operable by movement of said steam control valve to control the supply and exhaust of fluid to and from said fluid coupling.

3. In combination with the steam exhaust conduit of a reciprocating steam engine, the steam inlet conduit of a turbine engine, the reversing lever of the reciprocating engine, and a fluid coupling device for connecting the two engines; a fluid operated valve movable to two positions in one of which it directs steam from the exhaust conduit of the reciprocating engine into the inlet conduit of the turbine and in the other of which it diverts steam from the inlet conduit of the turbine, a source of fluid pressure, and means operable by movement of said reversing lever to one position to direct a flow of fluid to move said valve to one of its positions and by movement of said reversing lever to another position to direct a flow of fluid to move said valve to the other of its positions.

4. In combination with the steam exhaust conduit of a reciprocating steam engine, the steam inlet conduit of a turbine engine, the reversing lever of the reciprocating engine, and a fluid coupling device for connecting the two engines; a fluid operated valve movable to two positions in one of which it directs steam from the exhaust conduit of the reciprocating engine into the inlet conduit of the turbine and in the other of which it diverts steam from the inlet conduit of the turbine, a source of fluid pressure, means operable by movement of said reversing lever to one position to direct a flow of fluid to move said valve to one of its positions and by movement of said reversing lever to another position to direct a flow of fluid to move said valve to the other of its positions, a fluid coupling device for connecting the two engines, and means operable by said valve to control the exhaust of fluid from said coupling device.

5. In combination with the steam exhaust conduit of a reciprocating steam engine, the condenser of the engine, the steam inlet conduit of a turbine engine, the reversing lever of the reciprocating engine, and a fluid coupling device for connecting the two engines; a valve movable to two positions in one of which it directs steam from the exhaust conduit of the reciprocating engine into the inlet conduit of the turbine and in the other of which it cuts off steam from the turbine and directs steam from the exhaust of the reciprocating engine into the condenser, a source of fluid under pressure, valve means operable by said reversing valve to control the supply and exhaust of fluid to and from said fluid coupling, and means rendered effective by the turbine exceeding a predetermined rate of speed to vent the condenser.

In testimony whereof I have affixed my signature.

HANS WACH.